United States Patent
Grosse-Plankermann et al.

(10) Patent No.: US 8,991,757 B2
(45) Date of Patent: Mar. 31, 2015

(54) SELF-SUPPORTING CABIN STRUCTURAL SEGMENT

(75) Inventors: Peter Grosse-Plankermann, Neu Wulmstorf (DE); Martin Paetz, Hamburg (DE); Markus Goslar, Frankfurt an der Oder (DE)

(73) Assignee: Airbus Operations GmbH, Hamburg (DE)

( * ) Notice: Subject to any disclaimer, the term of this patent is extended or adjusted under 35 U.S.C. 154(b) by 350 days.

(21) Appl. No.: 13/479,538

(22) Filed: May 24, 2012

(65) Prior Publication Data

US 2012/0298799 A1 Nov. 29, 2012

Related U.S. Application Data

(60) Provisional application No. 61/489,612, filed on May 24, 2011.

(30) Foreign Application Priority Data

May 24, 2011 (DE) .......................... 10 2011 102 364

(51) Int. Cl.
*B64C 1/00* (2006.01)
*B64C 1/06* (2006.01)
*B64C 1/14* (2006.01)

(52) U.S. Cl.
CPC ............... *B64C 1/066* (2013.01); *B64C 1/1461* (2013.01); *B64C 2211/00* (2013.01)
USPC ....................................................... 244/119

(58) Field of Classification Search
USPC ............................ 244/119, 120, 117 R, 118.2
See application file for complete search history.

(56) References Cited

U.S. PATENT DOCUMENTS

| | | | |
|---|---|---|---|
| 2,095,626 A | 10/1937 | Bassett et al. | |
| 3,142,461 A * | 7/1964 | Naylor | ........................ 244/137.1 |
| 3,416,274 A | 12/1968 | Webb | |
| 4,050,208 A | 9/1977 | Pompei et al. | |
| 4,799,631 A | 1/1989 | Humphries et al. | |
| 4,989,809 A | 2/1991 | Arnold | |

(Continued)

FOREIGN PATENT DOCUMENTS

| | | |
|---|---|---|
| DE | 10339508 A1 | 3/2005 |
| DE | 102005023886 A1 | 12/2006 |

(Continued)

OTHER PUBLICATIONS

USPTO, U.S. Non-Final Office Action mailed Jun. 22, 2012 for U.S. Appl. No. 12/420,761.

(Continued)

*Primary Examiner* — Philip J Bonzell
(74) *Attorney, Agent, or Firm* — Ingrassia Fisher & Lorenz, P.C.

(57) ABSTRACT

A cabin structural segment is provided for an aircraft that includes, but is not limited to a fuselage structure and a floor structure. The fuselage structure defines an interior and separating it from an environment. The fuselage structure includes, but is not limited to an opening for a door. It is possible to provide via the opening a connection between the interior and the environment. The cabin structural segment is designed to be self-supporting. The cabin structural segment is fastenable exclusively to the floor structure. The cabin structural segment is constructed in such a way that the one cabin structural segment frames the opening.

16 Claims, 11 Drawing Sheets

(56) References Cited

U.S. PATENT DOCUMENTS

| | | | |
|---|---|---|---|
| 5,044,578 | A | 9/1991 | White et al. |
| 5,129,597 | A | 7/1992 | Manthey et al. |
| 5,201,831 | A | 4/1993 | Higgins et al. |
| 5,549,258 | A | 8/1996 | Hart et al. |
| 5,687,929 | A | 11/1997 | Hart et al. |
| 5,938,149 | A | 8/1999 | Terwesten |
| 6,158,690 | A | 12/2000 | Wadey et al. |
| 6,536,710 | B1 | 3/2003 | Bobzien et al. |
| 6,766,985 | B2 | 7/2004 | Dussac et al. |
| 6,848,654 | B1 | 2/2005 | Mills et al. |
| 7,156,345 | B2 | 1/2007 | Brauer et al. |
| D539,210 | S * | 3/2007 | Guard et al. ............ D12/345 |
| 7,237,749 | B2 * | 7/2007 | Ritts et al. ............... 244/118.5 |
| 7,252,267 | B2 * | 8/2007 | Young et al. ............ 244/118.5 |
| 7,270,297 | B2 | 9/2007 | Schaefer et al. |
| 7,293,739 | B2 * | 11/2007 | Young et al. ............ 244/118.5 |
| 7,331,545 | B2 * | 2/2008 | Young et al. ............ 244/118.5 |
| 7,380,752 | B2 | 6/2008 | Guard et al. |
| 7,448,574 | B2 * | 11/2008 | Young et al. ............ 244/118.5 |
| 7,461,816 | B2 | 12/2008 | Schwartz et al. |
| 7,478,781 | B2 | 1/2009 | Granzeier et al. |
| 7,516,919 | B2 | 4/2009 | Young et al. |
| 7,629,026 | B2 | 12/2009 | Sharma et al. |
| 7,987,596 | B2 * | 8/2011 | Ritts et al. ................ 29/897.31 |
| 8,226,033 | B2 * | 7/2012 | Koefinger et al. ........ 244/118.5 |
| 8,262,023 | B2 * | 9/2012 | Kofinger et al. ............ 244/119 |
| 8,430,362 | B2 * | 4/2013 | Graeber et al. ............. 244/185 |
| 8,474,758 | B2 * | 7/2013 | Koefinger et al. ............ 244/120 |
| 8,534,603 | B2 * | 9/2013 | Grosse-Plankermann et al. ................ 244/118.5 |
| 2005/0044712 | A1 | 3/2005 | Gideon et al. |
| 2005/0082430 | A1 * | 4/2005 | Young et al. ................ 244/119 |
| 2005/0211841 | A1 * | 9/2005 | Guard et al. ................ 244/119 |
| 2005/0236523 | A1 | 10/2005 | Schwartz et al. |
| 2006/0091259 | A1 * | 5/2006 | Young et al. ................ 244/119 |
| 2006/0102787 | A1 * | 5/2006 | Young et al. ................ 244/119 |
| 2007/0241234 | A1 * | 10/2007 | Young et al. ................ 244/119 |
| 2008/0128551 | A1 * | 6/2008 | Young et al. ................ 244/119 |
| 2008/0283662 | A1 | 11/2008 | Park |
| 2009/0146008 | A1 * | 6/2009 | Thiele ........................ 244/119 |
| 2009/0230244 | A1 * | 9/2009 | Kofinger et al. .......... 244/118.5 |
| 2009/0250554 | A1 | 10/2009 | Graeber et al. |
| 2009/0272849 | A1 * | 11/2009 | Koefinger et al. ........... 244/131 |
| 2011/0024565 | A1 * | 2/2011 | Koefinger et al. ........... 244/131 |
| 2011/0133027 | A1 | 6/2011 | Graeber et al. |
| 2012/0145828 | A1 | 6/2012 | Grosse-Plankermann et al. |

FOREIGN PATENT DOCUMENTS

| | | |
|---|---|---|
| DE | 102006048376 A1 | 4/2008 |
| GB | 2287517 A | 9/1995 |
| GB | 2317825 A | 4/1998 |
| JP | 56047400 A | 4/1981 |
| JP | 57004455 A | 1/1982 |
| JP | 2001171515 A | 6/2001 |
| JP | 2005112354 A | 4/2005 |
| JP | 2005125998 A | 5/2005 |
| RU | 2191716 C2 | 10/2002 |

OTHER PUBLICATIONS

Japansese Patent Office, JP Notice of Reasons for Rejection dated Aug. 23, 2012 for JP Application No. 58004710.
International Searching Authority, International Search Report dated Jan. 21, 2008 for International Application No. PCT/EP2007/008847.
German Patent Office, German Office Action dated Aug. 26, 2008 for German Patent Application No. 10 2006 048 376.6.
International Searching Authority, Partial International Search Report dated Oct. 7, 2009 for International Application No. PCT/EP2009/053301.
International Searching Authority, International Search Report dated Dec. 3, 2009 for International Application No. PCT/EP2009/053301.
German Patent Office, German Office Action dated May 28, 2010 for German Patent Application No. 10 2008 018 249.4.
Russian Patent Office, Russian Notice of Allowance dated Apr. 13, 2012 for Russian Patent Application No. 2009117472.
"Freitragend." Wikipedia, The Free Encyclopedia. Wikimedia Foundation, Inc., Aug. 3, 2011 [retrieved on Aug. 8, 2012]. Retrieved from Internet <URL: de.wikipedia.org/wiki/Freitragend>.
USPTO, Final Office Action for U.S. Appl. No. 12/420,761, mailed Jan. 3, 2013.
Response to Final Office Action for U.S. Appl. No. 12/420,761, mailed Apr. 3, 2013.
USPTO, Final Office Action for U.S. Appl. No. 12/420,761, mailed Dec. 27, 2013.
Response to Non-Final Office Action for U.S. Appl. No. 12/420,761, mailed Sep. 19, 2012.
Response to Non-Final Office Action for U.S. Appl. No. 12/420,761, mailed Sep. 17, 2013.
United States Patent and Trademark Office, Non-Final Office Action dated Jun. 19, 2013 for U.S. Appl. No. 12/420,761.
United States Patent and Trademark Office, US Notice of Allowance dated Jan. 10, 2013 for U.S. Appl. No. 12/936,714.

* cited by examiner

SELF-SUPPORTING CABIN STRUCTURAL SEGMENT

CROSS-REFERENCE TO RELATED APPLICATIONS

This application claims priority to German Patent Application No. 10 2011 102 364.3, filed May 24, 2011 and also priority to U.S. Provisional Patent Application No. 61/489,612, filed May 24, 2011, which are hereby incorporated herein by reference in their entirety.

TECHNICAL FIELD

The technical field relates to a cabin structural segment for an aircraft. In particular, the technical field relates to a cabin structural segment for an aircraft, which segment is designed to be self-supporting and frames an opening, an aircraft comprising the cabin structural segment, a cabin structural arrangement comprising the cabin structural segment and a cabin structural unit, an aircraft comprising the cabin structural arrangement, and a method for installing the cabin structural segment for an aircraft.

BACKGROUND

In modern commercial aircraft, cabin built-in elements, for example luggage compartments, lining parts or other interior built-in elements, are fastened directly to an aircraft structure, for example the formers, the stringers or other load-bearing elements of the aircraft fuselage. Owing to a wide range of structural stresses, for example the build-up of a pressure field in the passenger cabin, thermal deformations or flight mechanical loads, the aircraft structure is constantly subject to deformations. These deformations of the aircraft structure inevitably also result in a change in the position of the cabin built-in elements, since these are fastened directly to the structure.

In order to counteract these deformations of the aircraft structures and thus the displacements of the cabin built-in elements, in particular the lining parts, longitudinal and radial gaps having a sufficient width, which may for example be between approximately 8 mm and approximately 25 mm, extend between the cabin built-in elements. The door frames and the covers of the boarding regions, in particular, are fastened from many individual components to fastening elements, which are screwed or riveted directly or indirectly to the structure. Production inaccuracies of the individual components and addition of individual tolerances when assembling the individual components make it difficult to attach the door frames and the cover components precisely. For aesthetic reasons, the individual components which face the passenger cabin and can be seen by the passengers must be aligned with one another, since disharmony in the transition from one visible individual component to the adjacent, likewise visible individual component stands out and inevitably results in complaints. The entire door frame and cover assembly in the boarding region is therefore a very complex process and thus a very demanding assembly operation, which is therefore correspondingly time-consuming and thus cost-intensive.

DE 10 2006 048 376 discloses a self-supporting cabin structural unit for an aircraft, which unit can be fastened only to a floor structure and can be supported in a moment-free manner on a fuselage structure, the cabin structural unit being designed for attaching cabin built-in elements such as luggage compartments, seat units or step elements.

It may be considered at least one object to provide a cabin structure for the door frames and the covers of the boarding regions for a commercial aircraft, in which structure the number of individual components is reduced and the orientation of the individual components is simplified. In addition, other objects, desirable features and characteristics will become apparent from the subsequent summary and detailed description, and the appended claims, taken in conjunction with the accompanying drawings and this background.

SUMMARY

According to a first embodiment, a cabin structural segment is provided for an aircraft comprising a fuselage structure and a floor structure. The fuselage structure defines an interior and separates the interior from an environment. The fuselage structure comprises an opening for a door, it being possible to provide via the opening a connection between the interior and the environment. The cabin structural segment is designed to be self-supporting. The cabin structural segment can be fastened exclusively to the floor structure. The cabin structural segment is formed in such a way that the one cabin structural segment frames the opening.

In this context, fuselage structure is to be understood to mean reinforcing elements of the aircraft fuselage, for example stringers, formers or the outer skin. The floor structure generally has crossbars to which, for example, the rows of seats are fastened in modern commercial aircraft. For their part, the crossbars are usually supported on the formers of the fuselage structure by means of tension-compression rods, known as tie rods.

The opening in the fuselage structure is to be understood to mean the opening through which, for example, passengers coming from the gangway enter the aircraft, or rather the interior. This opening can be sealed with an aircraft door. Self-supporting is to be understood to mean that the cabin structural segment does not require further external load-bearing elements in order to fulfil its function. The construction thus supports itself. Thus, all the loads which occur during operation are absorbed centrally in the cabin structural segment. In this case, all the forces and/or moments acting on the cabin structural segment are introduced exclusively into the floor structure.

In addition, between the cabin structural segment and the fuselage structure there are no fastening elements which would be used to fasten the cabin structural elements to the fuselage structure. An intermediate space located between the fuselage structure and the cabin structural segment is thus free from fastenings. Owing to the lack of fastening elements of this type between the fuselage structure and the cabin structural segment, forces acting on the fuselage structure, as are produced for example by wind, temperature, pressure differences or other structural movements, are also not transmitted to the cabin structural segment. The cabin structural segment thus forms a unitary, self-supporting static unit, without absorbing deformation forces and/or deformation moments of the fuselage structure.

The framing formed in the cabin structural segment may be smaller than, the same size as, or larger than the opening for the door in the fuselage structure, which door is to be opened outwards, that is to say into the environment. Of course, the framing can also be selected in such a way that the door may be opened into the interior. The size of the area framed by the framing may thus not be bound to the size of the opening for the door. Owing to aesthetic and technical considerations, the size of the area framed by the framing will in general basically correspond to the size of the opening in the fuselage structure.

Against the background of the aesthetics in particular, an inner lining of the door comprising the cabin structural segment can be formed in such a way that a harmonious overall impression is produced. Owing to the lack of fastening elements between the fuselage structure and the cabin structural segment, cold bridges and structure-borne-noise bridges can be omitted. Equipment holders and structural holders, using which individual panels were previously fastened to the fuselage structure, are also omitted. Individual parts can thus be reduced significantly.

Owing to the avoidance of fastening elements and individual panels for constructing the door frames and the covers of the boarding regions, tools for producing the individual parts can be reduced. Owing to the styling of an individual self-supporting cabin structural segment which can be fastened exclusively to the floor structure and when installed frames the opening in the fuselage structure, the assembly is simplified. In addition, reference documentation and management thereof can be reduced. Electric components such as lighting, high channels, cabling or supply units can also be fastened directly to the cabin structural segment. Interfaces, as were previously required between the individual panels, can also be omitted. Interfaces are thus reduced. Overall, the provision of a cabin structural segment of this type results in a significant saving in terms of production and assembly costs. In visual terms, the cabin structural segment can be formed as a free-standing arch which is formed in one piece and through which a passenger can enter the interior of the aircraft.

According to a further embodiment, the one cabin structural segment frames two mutually opposing doors. Specifically owing to styling of this type, a separate cabin structural segment is not required for every door. Rather, two mutually opposing openings can be framed in a single cabin structural segment.

According to a further embodiment, the one cabin structural segment frames only mutually opposing longitudinal sides of an opening, which extend substantially transverse to the floor structure, and an upper side, opposing the floor structure, of the opening. The opening is thus framed by the one cabin structural segment on three sides, namely at the upper side opposing the floor structure and at the two longitudinal sides of the opening of the cabin structural segment, but not at the side facing the floor structure. Passage through a frame, framing the opening, of the cabin structural segment thus takes place in a sill-free manner. The term sill-free is thus to be understood to mean that the cabin structural segment does not require a frame element which reinforces the cabin structural segment in the region of the floor structure.

According to a further embodiment, the cabin structural segment comprises a frame part which frames the upper side, the frame part extending in a screen-like manner towards the fuselage structure. The frame part need not necessarily be straight; it can also be curved, for example. In this case, the frame part can be formed in such a way that it extends as close as possible to the opening for the door in the fuselage structure. This can be achieved for example by guiding the upper side of the frame part which frames the opening as close as possible to the fuselage structure in a screen-like manner.

This screen can, for example, be formed parallel to the floor structure. A configuration of this type avoids the possibility that, during flight operation, heat from the passenger cabin may be drawn out towards the cold fuselage structure via a gap that might otherwise be present between the framing of the cabin structural segment and the opening in the fuselage structure, despite the door being closed. This may result in an airstream from the passenger cabin towards the opening, or rather the door. Of course, for improved thermal insulation, the cabin structural segment can comprise a sealing element which can be connected to the fuselage structure. However, this insulating element may be designed in such a way that it cannot transmit any forces between the fuselage structure and the cabin structural segment. The insulating element can also be constructed in a noise-reducing and heat-insulating manner. Of course, frame parts which frame the longitudinal sides of the opening can also be brought as close as possible to the opening.

According to a further embodiment, the cabin structural segment comprises an arch segment and a cover segment, the arch segment extending substantially along an inner face of the fuselage structure from the floor structure to the cover segment. The cover segment is spaced apart from the floor structure. The arch segment and the cover segment are rigidly interconnected. The cover segment can also be formed in such a way that it also extends substantially along an inner face of the fuselage structure. However, this cover segment can also be planar, in such a way that it extends substantially parallel to the floor structure. In a configuration of this type in particular, a space is produced between the cabin structural segment, or rather the cover segment, and the fuselage structure, in which space aircraft components can be accommodated such that they are not visible to passengers. The cover segment and the arch segment can be formed in one piece. The cover segment can be spaced so far apart from the floor structure that there is sufficient spacing between a standing passenger and this cover segment.

According to a further embodiment, the cover segment comprises an outer face, the outer face being adjacent to the fuselage structure. An electric unit for supplying a passenger cabin with power can be fastened to the outer face. In this case, the electric unit for the power supply can be mounted in the interior either before or after the assembly of the cabin structural segment. The electric unit is formed in such a way that, if the electric unit is mounted on the outer face of the cover segment and is thus not visible to passengers, the electric unit is not additionally fastened to the fuselage structure.

According to a further embodiment, the cabin structural segment can be divided substantially centrally in the aircraft longitudinal direction, such that a first cabin structural segment and a second cabin structural segment are formed. A configuration of this type makes it possible on one hand for the cabin structural segment to be produced more easily and also handled more easily by the producer. On the other hand, a division of the cabin structural segment makes it possible for the cabin structural segment produced in cabin structural subsegments to be inserted into a fully assembled fuselage structure through the opening in the fuselage structure to the interior, positioned on the floor structure and orientated relative to the opening in the fuselage structure more easily than a cabin structural segment produced in one piece.

After positioning and orientation, the two cabin structural subsegments can be interconnected. In this case, too, the cabin structural segment made up of the first and the second cabin structural subsegment does not comprise any fastening elements with regard to the fuselage structure; rather, it is fastened only to the floor structure. The division can also offer the advantage that less space is required to put up the cabin structural subsegments within the fuselage structure than would be the case for a cabin structural segment produced in one piece.

According to a further embodiment, the first and the second cabin structural segment are formed so as to be identical. This can result in a saving with regard to the production and tool costs. Styling of this type also reduces the variety of the individual parts.

According to a further embodiment, the cabin structural segment comprises at least one transition segment in the aircraft longitudinal direction, the transition segment being rigidly connected to the cabin structural segment. In particular, the transition segment, which extends towards the lining parts of the passenger cabin, can be formed in such a way that an inner face, facing the passenger cabin, of the transition segment follows an inner contour formed by the lining parts. Thus, a passenger will not perceive the cabin structural segment as a separate component within the overall styling of the passenger cabin. It is also possible to construct the passenger cabin in the region of the windows using individual panels according to the prior art and only construct the boarding region comprising the self-supporting cabin structural segment using the transition segment. Of course, the transition segment can also accommodate seats, doors for toilet facilities or storage compartments.

According to a further embodiment, an aircraft is provided comprising a cabin structural segment of this type. According to a further embodiment, a cabin structural arrangement for an aircraft comprising a fuselage structure and a floor structure is provided, it being possible to connect the cabin structural segment in the aircraft longitudinal direction to a cabin structural unit for attaching cabin built-in elements for an aircraft. The cabin structural unit is arranged in such a way that a cabin built-in element can be attached. The cabin structural unit is formed so as to be self-supporting. The cabin structural unit can be fastened only to the floor structure. The cabin structural unit can be supported on the fuselage structure in a moment-free manner.

The cabin structural segment can thus be connected to a cabin structural unit as described in DE 10 2006 048 376. Of course, an insulating element can be inserted between the cabin structural segment and the cabin built-in element in order on one hand to compensate possible production tolerances of the cabin structural segment and/or the cabin structural unit. On the other hand, the insulating element can be used so as not to transmit forces applied to the cabin structural unit, which might result in deformation of the cabin structural unit, to the cabin structural segment.

According to a further embodiment, an aircraft is provided comprising a cabin structural arrangement of this type.

According to a further embodiment, a method for installing a cabin structural segment for an aircraft comprising a fuselage structure and a floor structure is provided, the fuselage structure defining an interior and separating it from an environment. The fuselage structure comprises an opening for a door, it being possible to provide via the opening a connection between the interior and the environment. The method comprises the following steps: pre-assembling the cabin structural segment in the environment of the fuselage structure, guiding the pre-assembled cabin structural segment through the opening of the fuselage structure into the interior, positioning the pre-assembled cabin structural segment at a predetermined location in the interior in such a way that the at least one opening is framed by the cabin structural segment, and fastening the cabin structural segment exclusively to the floor structure, the cabin structural segment being formed so as to be self-supporting. The method steps may relate mainly to the installation of a cabin structural segment produced in one piece.

According to a further embodiment, a method for installing a cabin structural segment for an aircraft comprising a fuselage structure and a floor structure is provided, the fuselage structure defining an interior and separating it from an environment. The fuselage structure comprises an opening for a door, it being possible to provide via the opening a connection between the interior and the environment. The method comprises the following steps: pre-assembling the cabin structural segment in the environment of the fuselage structure, dividing the pre-assembled cabin structural segment into a first and a second cabin structural subsegment in the environment, guiding the first and the second cabin structural subsegment through the opening of the fuselage structure into the interior, positioning the first and the second cabin structural subsegment at a predetermined location in the interior in such a way that the at least one opening is framed by the first and/or the second cabin structural subsegment, assembling the first and the second cabin structural subsegment to form the cabin structural segment, and fastening the cabin structural segment exclusively to the floor structure, the cabin structural segment being formed so as to be self-supporting.

It is noted that embodiments are described herein in connection with a cabin structural segment, an aircraft comprising a cabin structural segment, a cabin structural arrangement, an aircraft comprising a cabin structural arrangement, and a method for installing a cabin structural segment. In this context, it is clear to a person skilled in the art that the individual features described can be combined with one another in a variety of ways in order thus also to arrive at other embodiment configurations.

BRIEF DESCRIPTION OF THE DRAWINGS

Embodiments of the invention are described below with reference to the appended figures, which are merely schematic and are not to scale, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
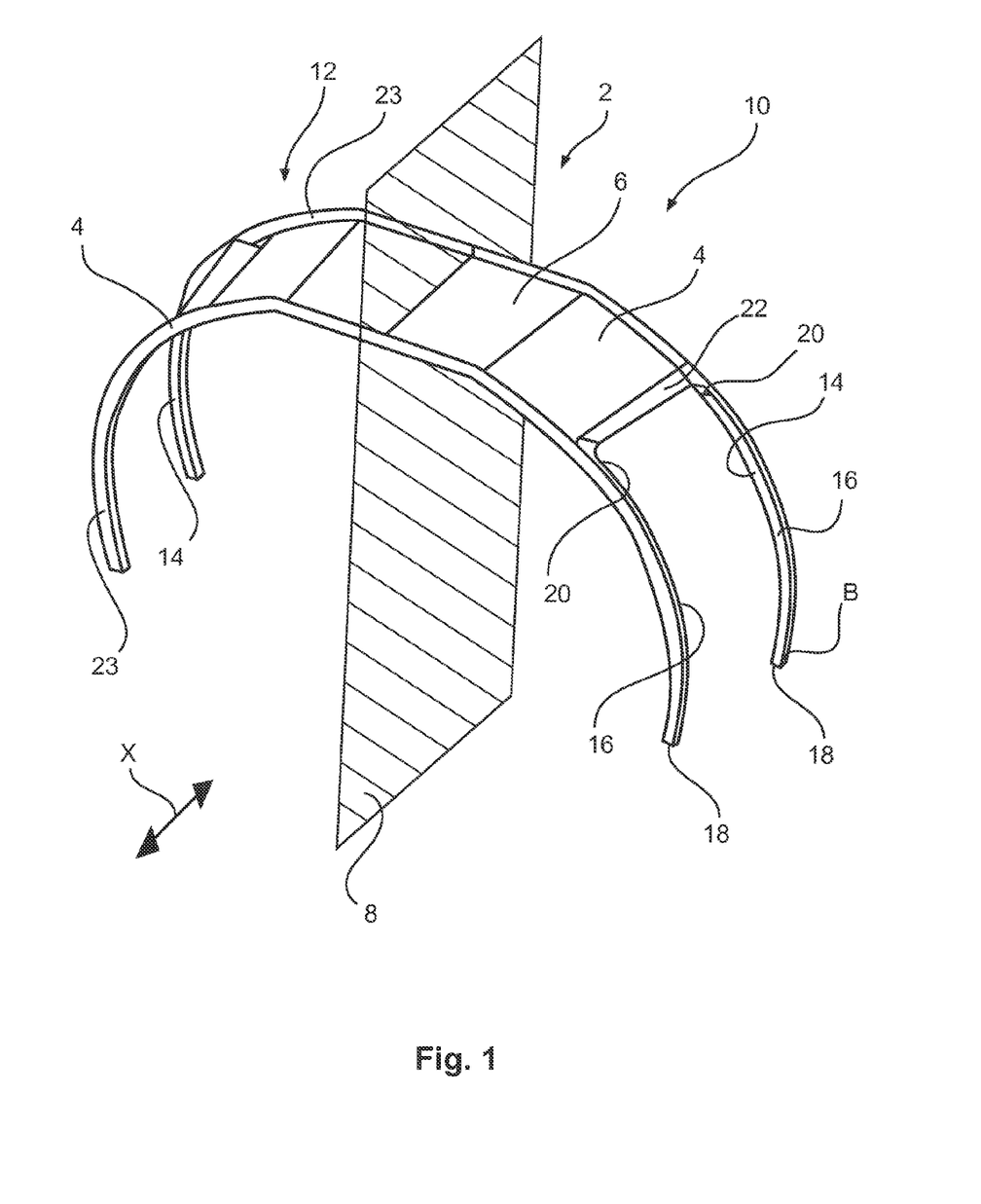
FIG. 1 is a 3D side view of a cabin structural segment.
Figure 2:
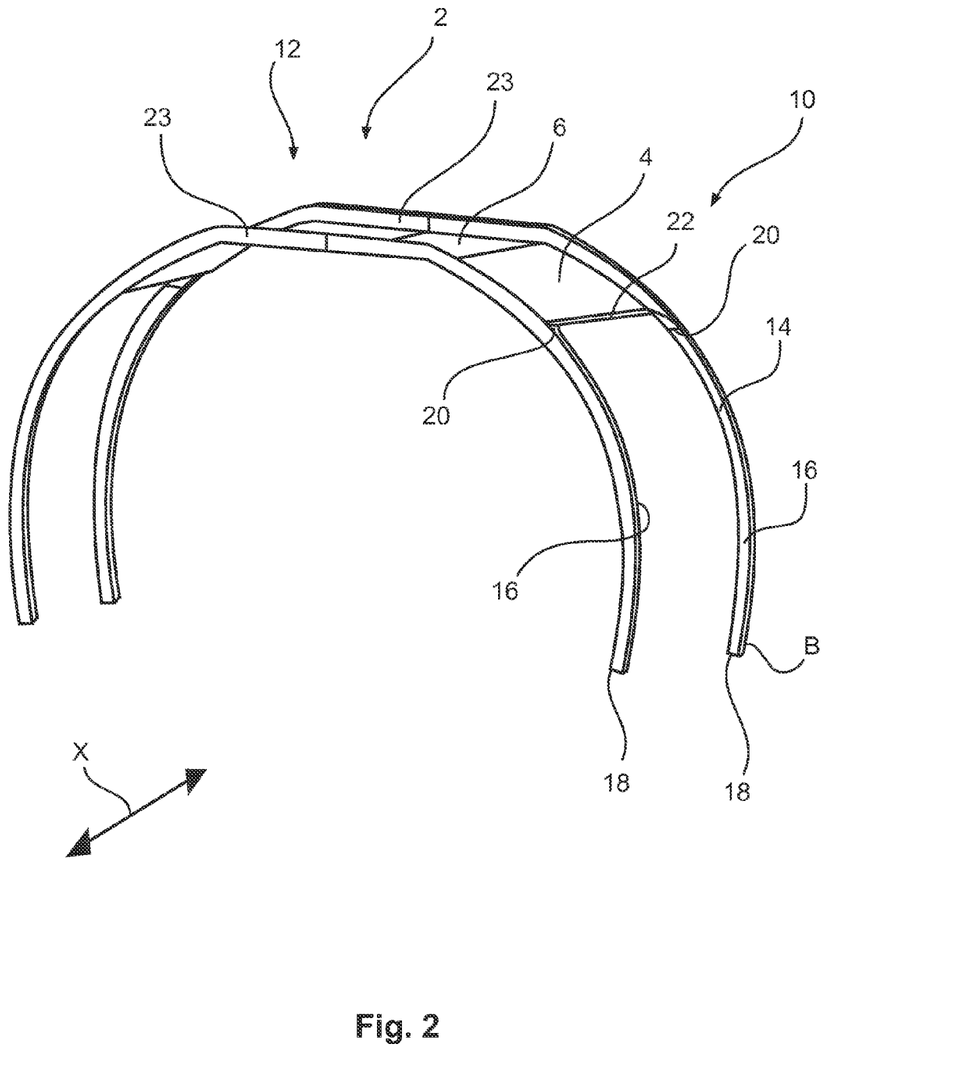
FIG. 2 is a further 3D side view of the cabin structural segment from FIG. 1.
Figure 3:
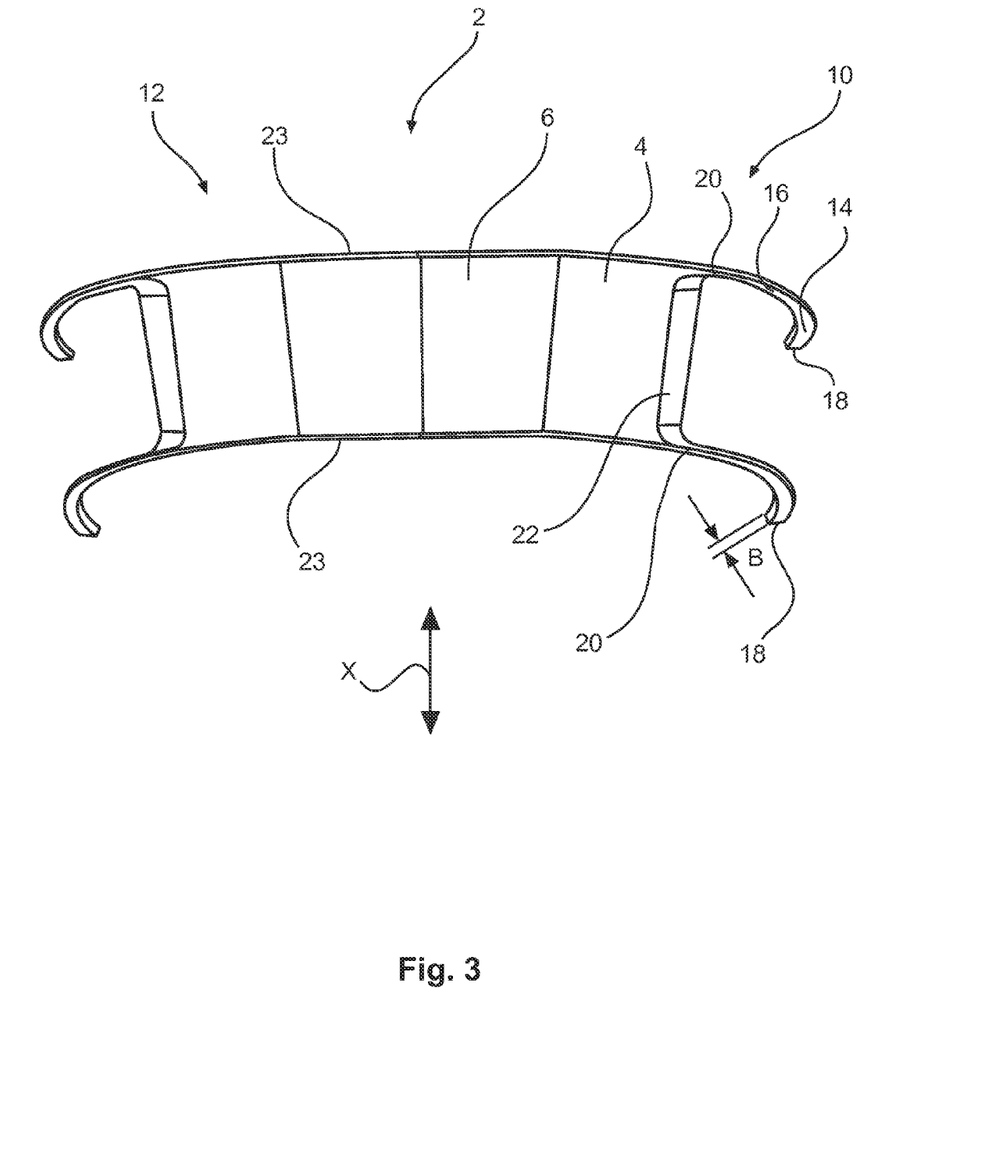
FIG. 3 is a 3D plan view of the cabin structural segment from FIG. 1.

FIG. 1 to FIG. 3 show a cabin structural segment 2 comprising an arch segment 4 and a cover segment 6, the representation of the cabin structural segment 2 in the individual figures differing merely in terms of the views. In this case, the arch segment 4 and the cover segment 6 are rigidly interconnected. FIG. 1 also shows a centre plane 8 which extends parallel to an aircraft longitudinal direction X which is represented by a double arrow. In this case, the centre plane 8 divides the cabin structural segment 2 into a first cabin structural subsegment 10 and a second cabin structural subsegment 12.

The first cabin structural subsegment 10 is mirror-symmetrical to the second cabin structural subsegment 12. In the representation selected in this case, the first cabin structural subsegment 10 and the second cabin structural subsegment 12 are each formed in one piece. The representation selected in this case shows both a cabin structural segment 2 formed in one piece and a cabin structural segment 2 made up of the first cabin structural subsegment 10 and the second cabin structural subsegment 12.

Each cabin structural subsegment 10, 12 and the cabin structural segment 2 formed in one piece are each designed to be self-supporting. The arch segment 4 extends substantially along a fuselage structure (not shown in this case) of an aircraft. The cover segment 6 is formed substantially parallel to a floor structure (also not shown in this case) of an aircraft. The cabin structural segment 2 has, in the region of the arch segments 4 thereof, a respective opening 14, the two openings 14 opposing one another. The individual elements are described below merely in connection with the first cabin structural subsegment 10, since this is more visible. The representation selected in this case also applies for the second cabin structural subsegment 12 and for the cabin structural segment 2 formed in one piece.

The opening 14, which is shown in the first cabin structural subsegment 10 and basically corresponds to an opening (not shown in this case) for a door in a fuselage structure, is defined by two frame longitudinal profiles 16 and a frame part 22 in the form of a frame transverse profile. The two frame longitudinal profiles 16 and the frame transverse profile 22 are components of the arch segment 4 and are accordingly formed in one piece with the first cabin structural subsegment 10. Each frame longitudinal profile 16 extends from a first end 18 of the frame longitudinal profile to a second end 20 of the frame longitudinal profile. The first end 18 of each frame longitudinal profile can be rigidly connected to a floor structure (not shown in this case). The second end 20 of each frame longitudinal profile ends at the frame transverse profile 22 and is rigidly connected thereto.

The frame transverse profile 22 extends in a screen-shaped manner and substantially parallel to the floor structure in the direction of the fuselage structure. The cabin structural segment 2 also has, at its sides which extend transverse to the aircraft longitudinal direction X, a peripheral edge 23. The cabin structural segment 2 thus forms a U-shaped cross-section when looking towards the centre plane 8. The peripheral edge 23 can also coincide with one frame longitudinal profile 16 or the two frame longitudinal profiles 16. In the embodiment shown in this case, the frame longitudinal profile 16 is spaced apart from the peripheral edge 23.

In particular when using CFRP materials, very stabile and very light constructions are possible, and widths B of a few millimetres between an outer face, facing the opening 14, of the frame longitudinal profile 16 and an outer face, opposite the outer face of the frame longitudinal profile, of the adjacent peripheral edge 23 are therefore sufficient for self-supporting styling. It can also clearly be seen that the two frame longitudinal profiles 16 do not comprise a connecting element, for example in the form of a sill, connecting the two frame longitudinal profiles 16 in the vicinity of the floor structure and thus in the region of the first ends 18 of the two frame longitudinal profiles. A sill-less passage through the opening 14 of the cabin structural segment 2 is thus possible for passengers.

Figure 4:
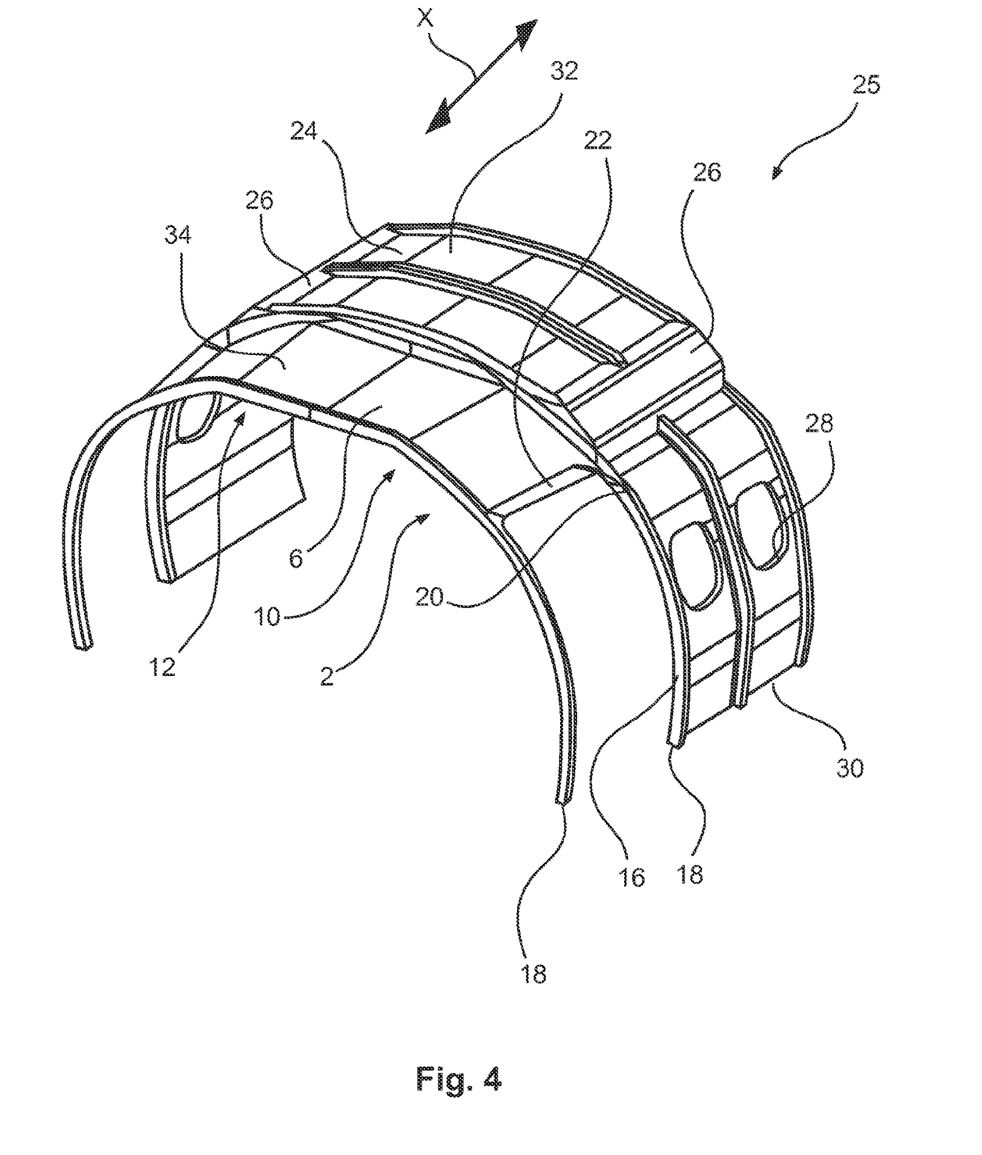
FIG. 4 is a 3D side view of a cabin structural arrangement comprising the cabin structural segment from FIG. 1 and a cabin structural unit.

FIG. 4 is a 3D side view of a cabin structural arrangement 25 comprising the cabin structural segment 2 already known from FIGS. 1 to 3 and a cabin structural unit 24. In this case, the cabin structural unit 24 is rigidly connected to the cabin structural segment 2 in the aircraft longitudinal direction X. The cabin structural segment 2 can be made in one piece or assembled from the first 10 and the second cabin structural subsegment 12. On each side along the aircraft longitudinal direction X the cabin structural unit 24 has an indentation 26 for receiving cabin built-in elements in the form of overhead storage compartments (not visible in this case). The cabin structural unit 24 is also formed so as to be self-supporting. In this case, ends 30 of the cabin structural unit 24 are fastened only to the floor structure (not shown in this case). The elements which can be used to support the cabin structural unit 24 on the fuselage structure in a moment-free manner are not shown on an outer face 32, facing the fuselage structure, of the cabin structural unit 24.

In contrast thereto, an outer face 34, facing the fuselage structure, of the cabin structural segment 2 has no elements which may be used to connect the cabin structural segment 2 to the fuselage structure. The outer face 34 also has no elements which may be used to support the cabin structural segment 2 on the fuselage structure. The cabin structural unit 24 also has openings 28 for windows of the aircraft.

Figure 5:
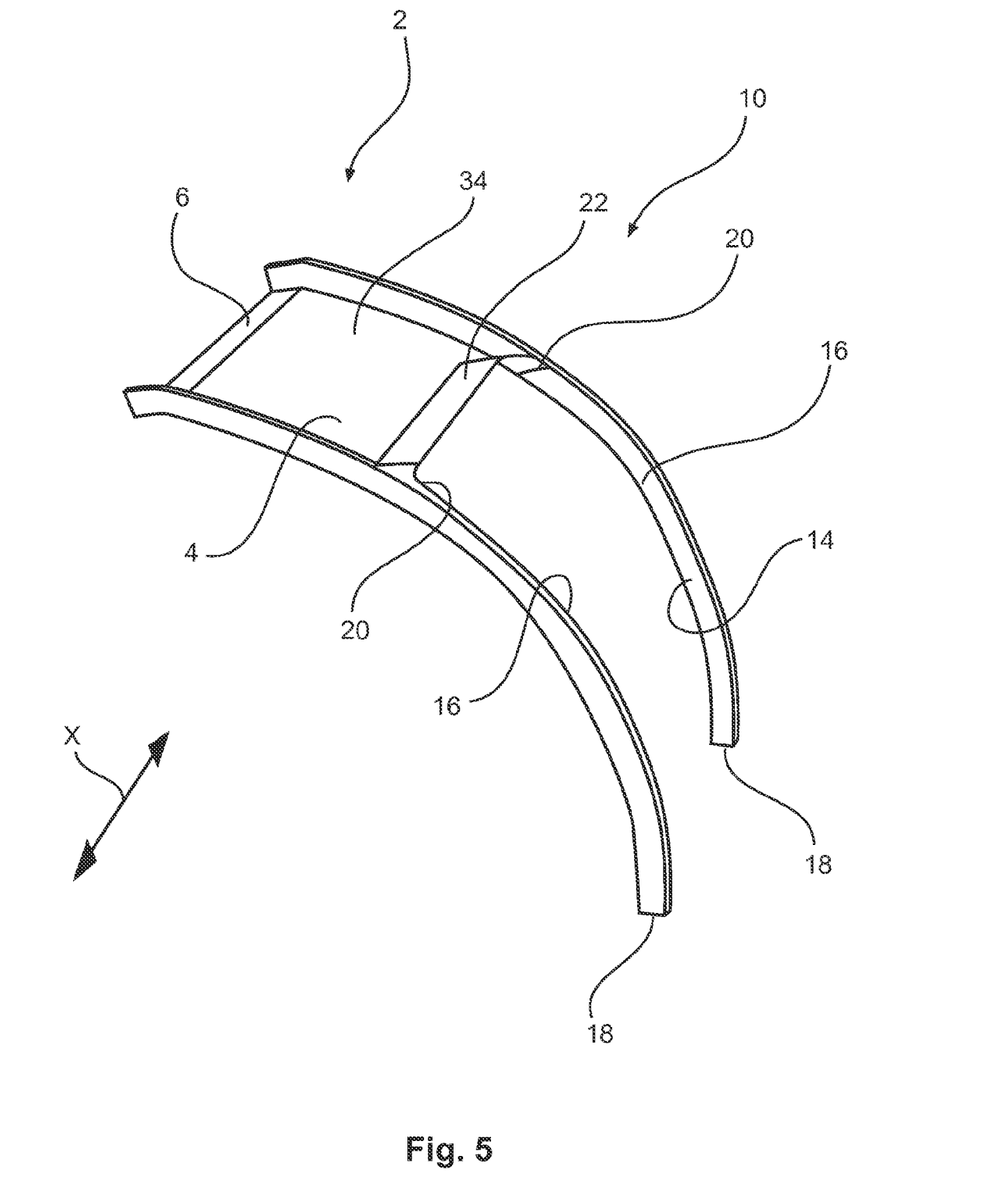
FIG. 5 is a 3D side view of a first cabin structural subsegment.

FIG. 5 shows the first cabin structural subsegment 10. In contrast to the representations of FIGS. 1 to 3, in this case the cabin structural segment 2 has been divided mechanically along the centre plane 8 in the aircraft longitudinal direction X into the first 10 and the second cabin structural subsegment 12, only the first cabin structural subsegment 10 being shown in this case. Otherwise, the configuration of the cabin structural subsegment 10 is no different from the representation of FIG. 1 to FIG. 3.

Figure 6:
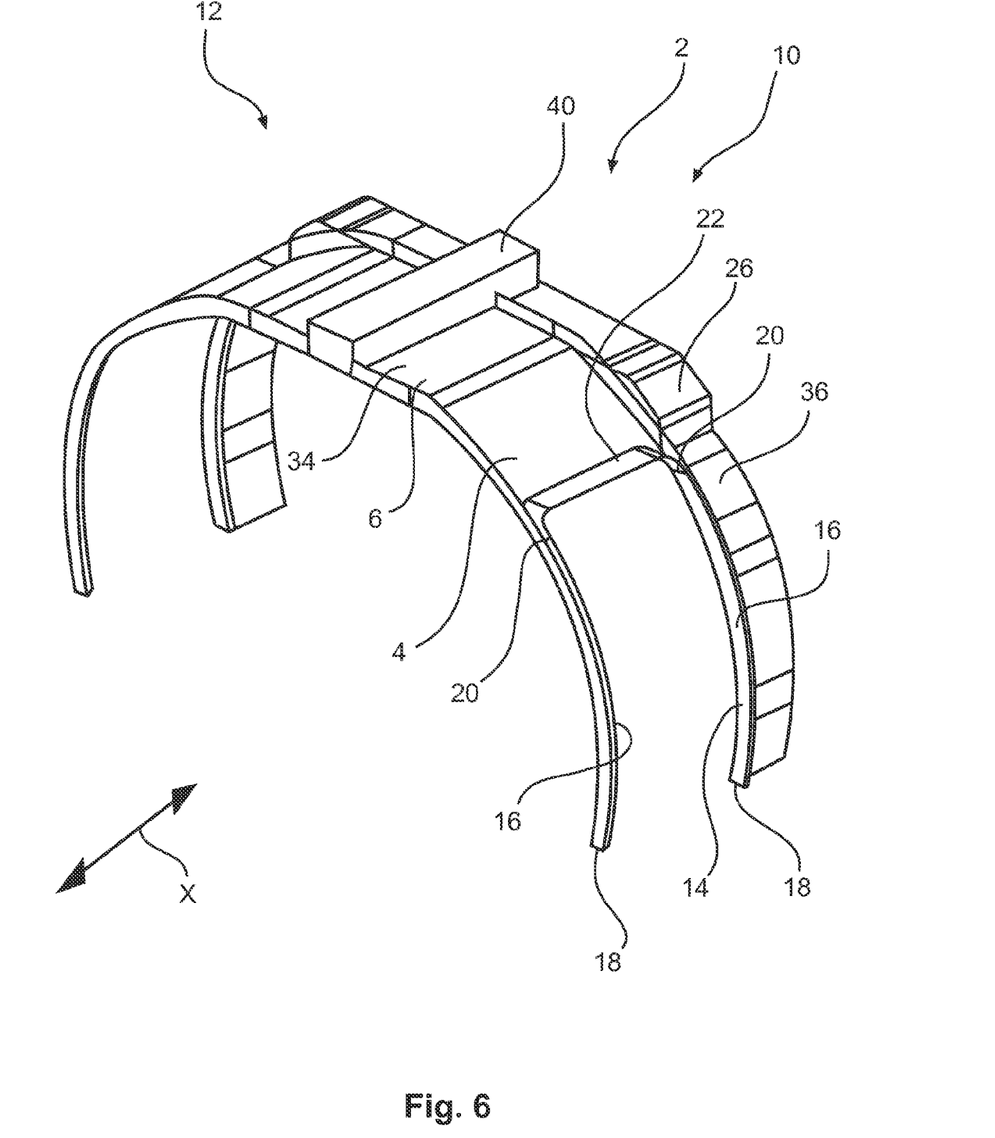
FIG. 6 is a 3D side view of a cabin structural segment comprising a transition segment and an electric unit rigidly connected to the cabin structural segment.

FIG. 6 is a 3D side view of the cabin structural segment 2 comprising a transition segment 36 and an electric unit 40 which is rigidly connected to the outer face 34 of the cabin structural segment 2. In this case, the electric unit 40 for distributing power into a passenger cabin extends along the aircraft longitudinal direction X. Of course, the electric unit 40 can also be arranged transverse to the aircraft longitudinal direction X. The transition segment 36 is rigidly fastened to the cabin structural segment 2. The transition segment 36 can also be formed in one piece with the cabin structural segment 2. The transition segment 36 has indentations 26 in which storage compartments of the cabin structural unit 24 can be arranged. The electric unit 40 is connected only to the cover segment 6 of the cabin structural segment 2 and has no fastening to the adjacent fuselage structure. The electric unit 40 also does not hinder the self-supporting structure of the cabin structural segment 2 in such a way that connections to the fuselage structure would then be necessary.

Figure 7:
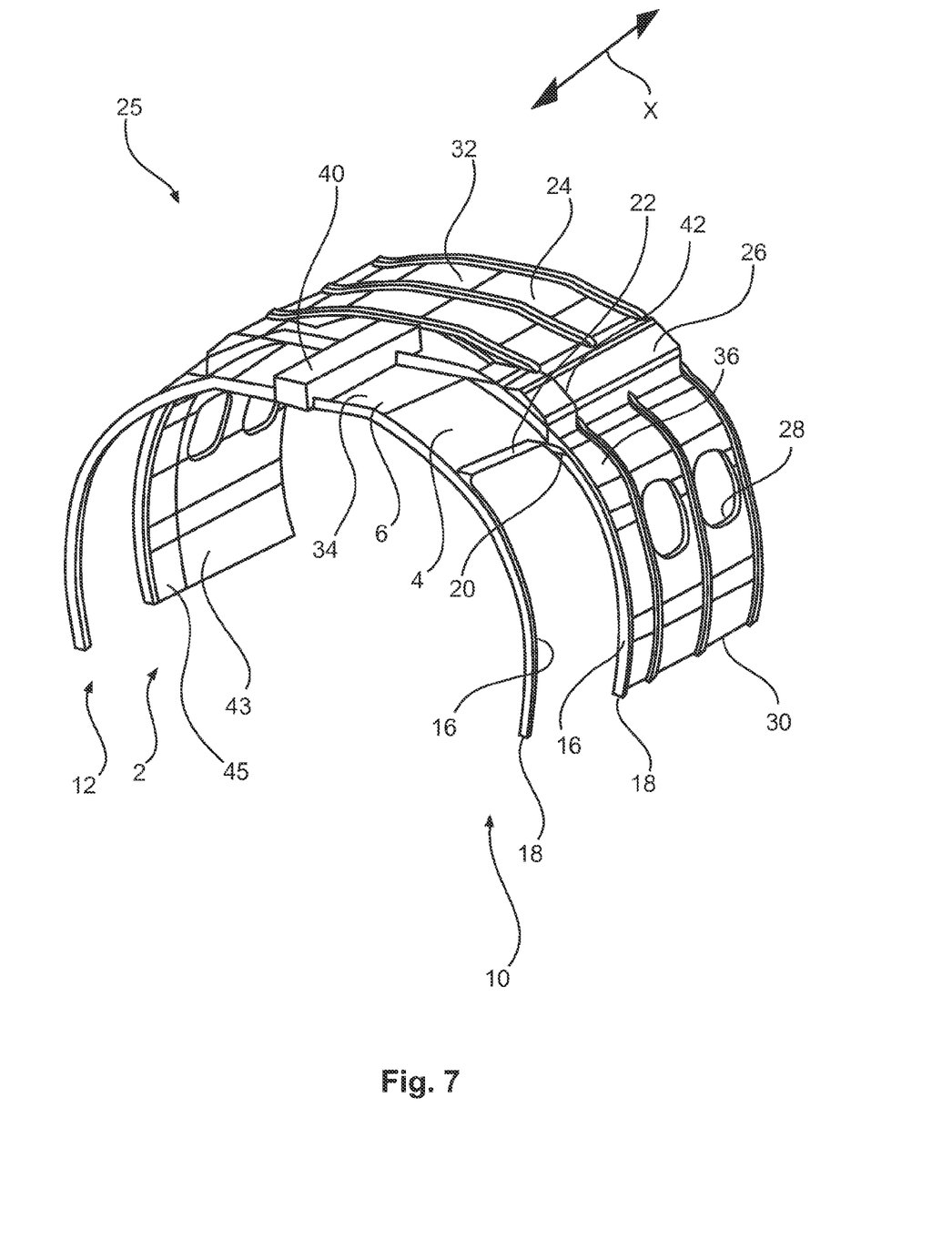
FIG. 7 shows a cabin structural arrangement comprising the cabin structural segment from FIG. 6 and a cabin structural unit.

FIG. 7 shows the cabin structural arrangement 25 comprising the cabin structural segment 2 comprising the transition segment 36 from FIG. 6 and the cabin structural unit 24 already known from FIG. 4. A damping element 42 is arranged at an interface 41 between the transition segment 36 and the cabin structural unit 24. At the interface 41 the transition segment 36 is also formed in accordance with the cabin structural unit 24, in such a way that an inner face 43, facing the passenger cabin, of the cabin structural unit 24 and an inner face 45, likewise facing the passenger cabin, of the transition segment 36 produce an aesthetic overall impression. In the embodiment shown in this case, the inner face 43 of the cabin structural unit 24 transitions smoothly into the inner face 45 of the transition segment 36.

Figure 8:
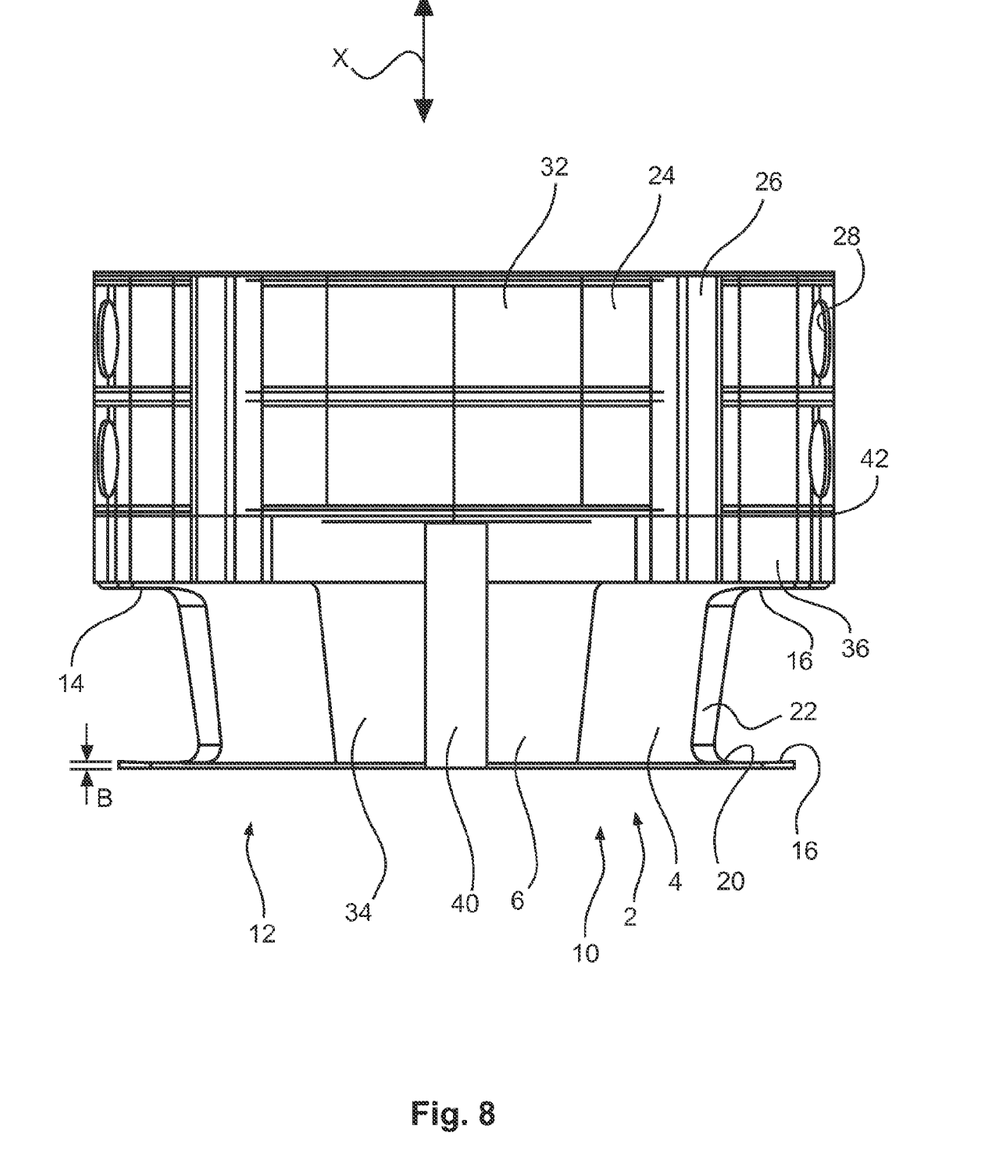
FIG. 8 is a plan view of the cabin structural arrangement from FIG. 7.

FIG. 8 is a plan view of the cabin structural arrangement 25 from FIG. 7. It can clearly be seen how small the width B of the frame longitudinal profile 16 and of the peripheral edge 23 is, in the selected embodiment the edge 23 transitioning into the frame longitudinal profile 16 and continuously having the width B. The width is selected from approximately 2 to approximately 5 mm.

Figure 9:
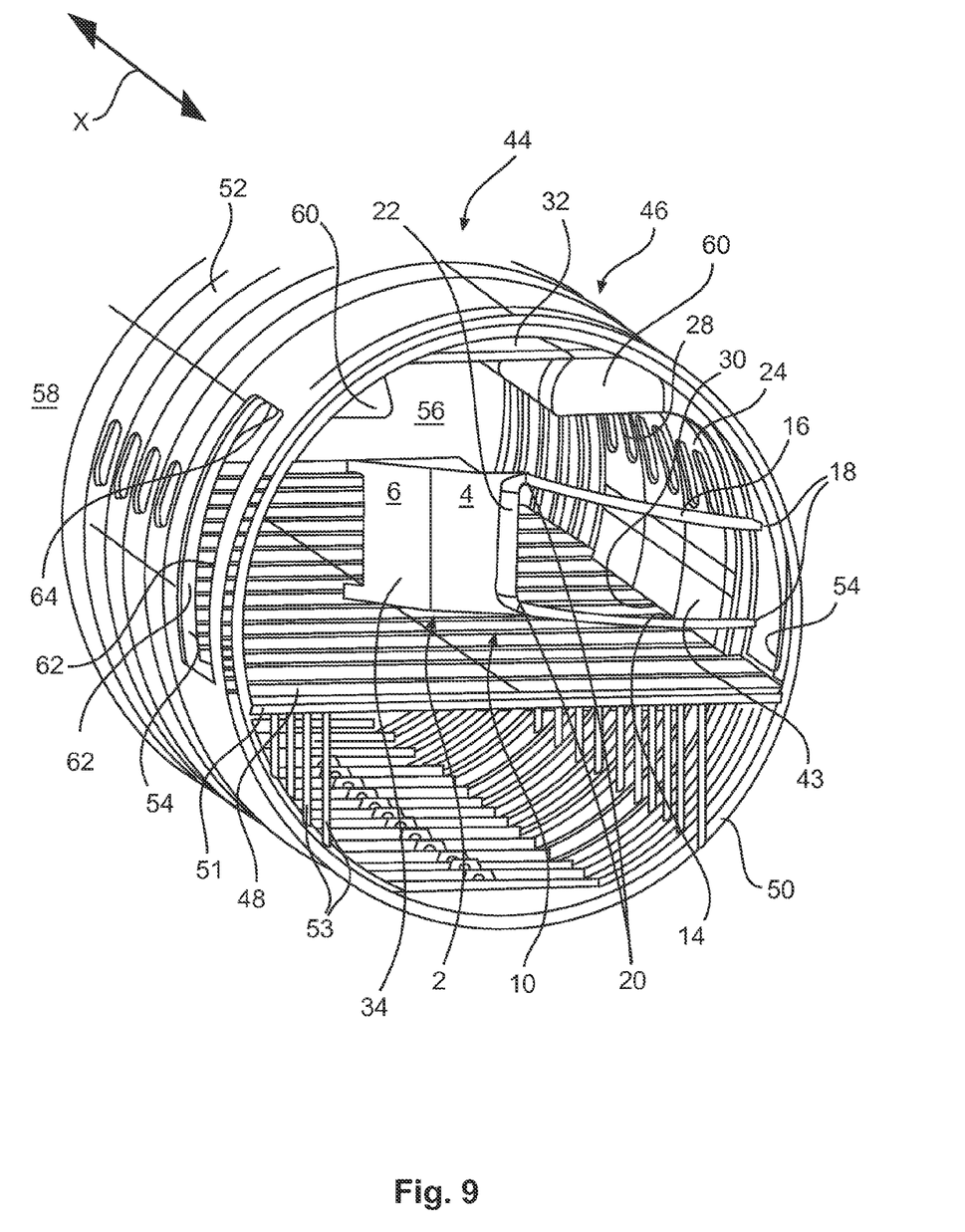
FIG. 9 is a 3D representation of a cross-section through a fuselage structure of an aircraft, in which fuselage structure a first cabin structural subsegment has been inserted into an interior through an opening for a door.

FIG. 9 is a 3D representation of a cross-section through an aircraft fuselage 44. The fuselage structure 46 and the floor structure 48 are clearly visible. The fuselage structure 46 basically consists of formers 50, stringers (not shown in this case) and an outer skin 52. The fuselage structure 46 also has two mutually opposing openings 54 which can be sealed by means of doors (not shown in this case) which open into an environment 58. The opening 54 is defined by longitudinal sides 62 of the opening, which oppose one another and extend substantially transverse to the floor structure 48, and an upper side opposite the floor structure 48. The fuselage structure 46 defines an interior 56 and separates it from the environment 58. A passenger wishing to enter the aircraft passes from the environment 58 into the interior 56 through the opening 54, for example via a gangway. The interior 56 can thus be connected to the environment 58 via the sealable opening 54.

The floor structure 48 mainly has crossbars 51 which extend transverse to the aircraft longitudinal direction X and are supported on the formers by means of tension-compression rods 53. A portion of the interior 56 is equipped with cabin structural units 24, the inner faces 43 of which define the passenger cabin. It can clearly be seen that the ends 30 of the cabin structural unit 24 are connected to the floor structure 48. Overhead storage compartments 60 are already mounted on the cabin structural units 24. To facilitate handling, the cabin structural segment 2 is divided into the first 10 and the second cabin structural subsegment 12, only the first cabin structural subsegment 10 already known from FIG. 5 being shown in this case. The first cabin structural subsegment 10 has been displaced from the environment 58 into the interior 56 through the opening 54 of the fuselage structure 46. It can clearly be seen that the first cabin structural subsegment 10 is wider than the opening 54, and the first cabin structural subsegment 10 was therefore guided on end through the opening 54.

Figure 10:
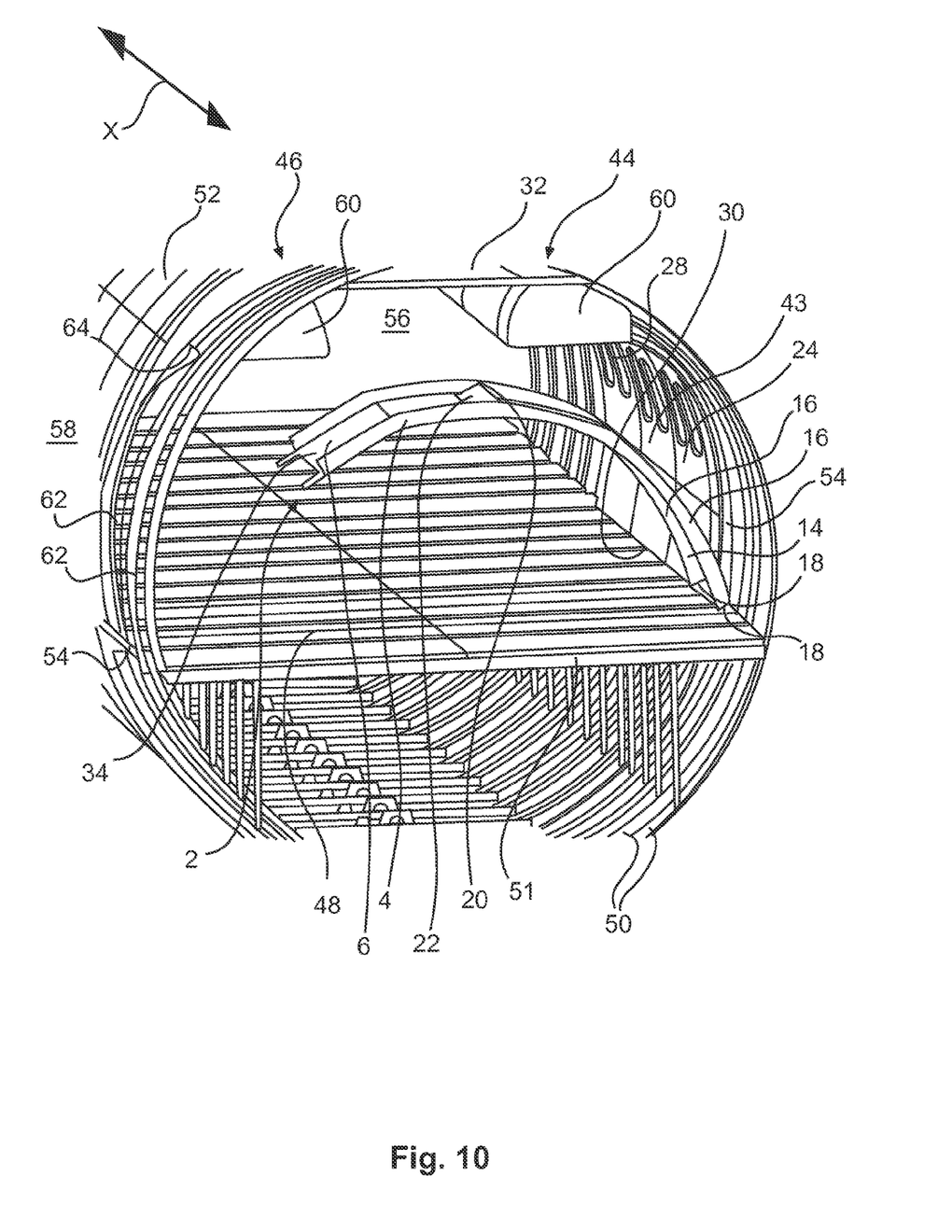
FIG. 10 is a further 3D representation of a cross-section through a fuselage structure of an aircraft, the first cabin structural subsegment from FIG. 9 having been positioned at a predetermined location on a floor structure.

FIG. 10 differs from the representation of FIG. 9 in that the first cabin structural subsegment 10 has been displaced from its upended position in such a way that the first ends 18 of the frame longitudinal profiles and thus the first cabin structural subsegment 10 were then positioned at a predetermined location in the interior 56, or rather on the floor structure 48.

Figure 11:
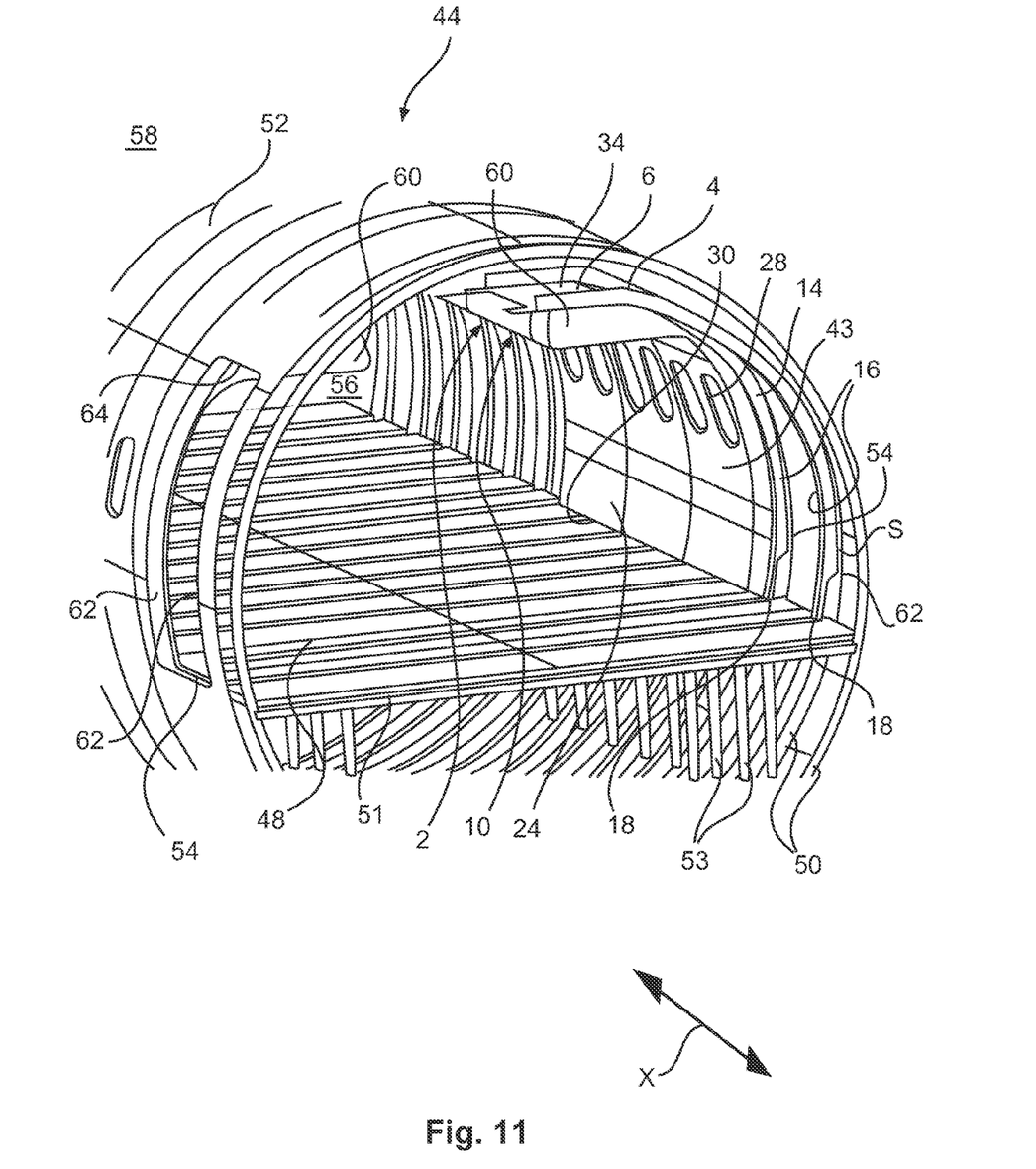
FIG. 11 is a further 3D representation of a cross-section through a fuselage structure of an aircraft, the first or the second cabin structural subsegment from FIG. 10 framing the opening for a door.

FIG. 11 differs from the representation of FIG. 10 in that the first cabin structural subsegment 10 has been displaced into its final position. For the sake of clarity, the second cabin structural subsegment 12 is not shown. The second cabin structural subsegment would also be fastened to the floor structure and, together with the first cabin structural subsegment 10, would form the self-supporting cabin structural segment 2. It is self-evident that the two cabin structural subsegments 10, 12 are also each formed so as to be individually self-supporting. It can clearly be seen that the first cabin structural subsegment 10 and thus also the cabin structural segment 2 frame the opening 54 of the fuselage structure 46.

In particular, the two frame longitudinal profiles 16 frame the longitudinal sides 62 of the opening and the frame transverse profile 22 frames the upper side 64 of the opening 54. It can also be seen that the two frame longitudinal profiles 16 and the frame transverse profile 22 are formed in such a way that a gap S between the cabin structural segment 2 and the fuselage structure 46, which gap extends around the two frame longitudinal profiles 16 and the frame transverse profile 22, is minimal.

In particular owing to the styling of the very narrow gap S between the fuselage structure 46 and the frame transverse profile 22, a situation can be avoided in which, during flight operation, heat from the subsequent passenger cabin would be drawn out to the cold fuselage structure 46 via a gap which might otherwise be present in a wider form between the frame transverse profile 22 of the cabin structural segment 2 and a closed lined door. This would result in a draught in the region of the openings 54, and this may impact on the comfort of passengers sitting in the vicinity of the opening 54.

The configuration of the cabin boarding module as a self-supporting cabin structural segment 2 makes it possible to omit cold bridges and structure-borne-noise bridges owing to the lack of connecting elements between the cabin structural segment 2 and the fuselage structure 46. Equipment holders and structural holders are also omitted. The number of individual parts is also reduced, and this in turn results in a reduction in tools and a reduction in reference documentation and the management thereof. The assembly is also greatly simplified. In addition, electric components such as high channels, cabling or other electric, pneumatic or hydraulic devices can be arranged directly at the cabin structural segment 2. Interfaces are also reduced, in that the plurality of lining panels required to construct the boarding module has been reduced to a single cabin structural segment 2. This also results in significant savings in terms of production and assembly costs.

In addition, it should be noted that "comprising" does not exclude any other elements or steps and that "a" or "an" does not exclude a plurality. It should also be noted that features or steps which have been described with reference to one of the above embodiments can also be used in combination with other features or steps of other embodiments described above. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An aircraft comprising:
   a fuselage structure that at least partially defines an interior and separates the interior from an environment, the fuselage structure comprising a door opening and a connection between the interior and the environment that is providable via the door opening;
   a floor structure,
   the cabin structural segment that is self-supporting, the cabin structural segment including two frame longitudinal profiles and a frame transverse profile that cooperate to frame mutually opposing longitudinal sides of the door opening and an upper side, opposing the floor structure, of the door opening, wherein the two frame longitudinal profiles of the cabin structural segment are fastened exclusively to the floor structure of the aircraft.

2. The cabin structural segment according to claim 1, wherein the cabin structural segment is configured to frame two mutually opposing door openings.

3. The cabin structural segment according to claim 1, further comprising at least one transition segment in an aircraft longitudinal direction, the transition segment rigidly connected to the cabin structural segment.

4. The cabin structural segment according to claim 1, wherein the mutually opposing longitudinal sides of the door opening extend substantially transverse to the floor structure.

5. The cabin structural segment according to claim 4, further comprising a frame part that frames the upper side, the frame part extending in a screen-like manner towards the fuselage structure.

6. The cabin structural segment according to claim 1, further comprising:
an arch segment; and
a cover segment rigidly interconnected to the arch segment, wherein the arch segment extending substantially along an inner face of the fuselage structure from the floor structure to the cover segment, and
wherein the cover segment is spaced apart from the floor structure.

7. The cabin structural segment according to claim 6, wherein the cover segment comprises an outer face, the outer face being adjacent to the fuselage structure, and configured for an electric unit for supplying a passenger cabin with power to be fastened to the outer face.

8. The cabin structural segment according to claim 1, wherein the cabin structural segment is dividable substantially centrally in an aircraft longitudinal direction to form a first cabin structural segment and a second cabin structural segment.

9. The cabin structural segment according to claim 8, wherein the first cabin structural segment and the second cabin structural segment are substantially identical.

10. An aircraft comprising:
a fuselage structure that at least partially defines an interior and separates the interior from an environment, the fuselage structure comprising a door opening and a connection between the interior and the environment that is providable via the door opening;
a floor structure;
a cabin structural unit that is configured to attach to a cabin built-in element and formed to self-support; and
a cabin structural segment connectable to the cabin structural unit, the cabin structural segment including two frame longitudinal profiles and a frame transverse profile that define an opening such that the cabin structural segment frames mutually opposing longitudinal sides of the door opening and an upper side, opposing the floor structure, of the door opening when the two frame longitudinal profiles of the cabin structural segment are fastened to the floor structure of the aircraft, wherein the cabin structural unit is fastenable only to the floor structure of the aircraft, and wherein the cabin structural unit is supportable on the fuselage structure in a moment-free manner.

11. A method for installing a cabin structural segment for an aircraft comprising a fuselage structure and a floor structure, the fuselage structure defining an interior and separating it from an environment, the fuselage structure comprising a door opening, a connection between the interior and the environment is possible via the door opening; the method comprising:
pre-assembling the cabin structural segment in an environment of the fuselage structure the cabin structural segment including two frame longitudinal profiles and a frame transverse profile;
guiding the pre-assembled cabin structural segment through the door opening of the fuselage structure into the interior;
positioning the pre-assembled cabin structural segment at a predetermined location in the interior such that the door opening is framed by the cabin structural segment;
fastening the two frame longitudinal profiles of the cabin structural segment exclusively to the floor structure of the aircraft, and
forming the cabin structural segment to be self-supporting.

12. The method according to claim 11, further comprising dividing the pre-assembled cabin structural segment into a first cabin structural subsegment and a second cabin structural subsegment in the environment.

13. The method according to claim 12, assembling the first cabin structural subsegment and the second cabin structural subsegment to form the cabin structural segment.

14. The method according to claim 12, wherein the guiding the pre-assembled cabin structural segment through the door opening of the fuselage structure into the interior comprises guiding the first cabin structural subsegment and the second cabin structural subsegment through the door opening of the fuselage structure into the interior.

15. The method according to claim 14, wherein the positioning the pre-assembled cabin structural segment at the predetermined location in the interior such that the door opening is framed by the cabin structural segment comprises:
positioning the first cabin structural subsegment and the second cabin structural subsegment at a predetermined location in the interior such that the door opening is framed by the first cabin structural subsegment.

16. The method according to claim 14, wherein the positioning the pre-assembled cabin structural segment at the predetermined location in the interior such that the door opening is framed by the cabin structural segment comprises:
positioning the first cabin structural subsegment and the second cabin structural subsegment at a predetermined location in the interior such that the door opening is framed by the second cabin structural element.

* * * * *